United States Patent [19]
Wolber

[11] 3,732,017
[45] May 8, 1973

[54] GAS ANALYZER UTILIZING A TUNABLE LASER WITH A REFERENCE SUBSTANCE IN THE LASER CAVITY

[75] Inventor: William G. Wolber, Southfield, Mich.

[73] Assignee: The Bendix Corporation, Southfield, Mich.

[22] Filed: Oct. 23, 1970

[21] Appl. No.: 83,391

[52] U.S. Cl.................356/201, 250/43.5 R, 356/51, 356/74
[51] Int. Cl........................G01n 21/06, G01n 21/34
[58] Field of Search.......................250/43.5 R, 226; 331/94.5; 356/74, 96, 98, 201, 51

[56] References Cited

UNITED STATES PATENTS

| 2,212,211 | 8/1940 | Pfund | 250/43.5 R |
| 3,277,396 | 10/1966 | Statz et al. | 331/94.5 |
| 3,287,556 | 11/1966 | Good | 250/43.5 R |
| 3,609,583 | 9/1971 | Brun | 331/94.5 |
| 3,588,253 | 6/1971 | Whittmann | 356/93 |

FOREIGN PATENTS OR APPLICATIONS

| 1,113,986 | 5/1968 | Great Britain | 250/435 R |

Primary Examiner—Ronald L. Wibert
Assistant Examiner—J. P. McGraw
Attorney—Lester L. Hallacher and Plante, Hartz, Smith & Thompson

[57] ABSTRACT

A gas analyzer which employs a tunable laser is described. The laser is tunable over a well defined bandwidth so that coherent energy of all frequencies within the bandwidth is available. A known gas is introduced into the laser cavity so that the laser will lase only at the frequencies which correspond to the absorption frequencies of the gas. The output of the swept laser is therefore a reference spectrum containing a series of lines which correspond to the absorption frequencies of the known gas. The reference spectrum is therefore uniquely characteristic of the known gas. By illuminating a sample of an unknown gas with the reference spectrum some of, or all of, the peaks will be absorbed when the unknown gas partially, or completely, is composed of gases identical to those of the reference gas. The illumination from the unknown gas is detected with a broad band detector and the composition of the unknown gas identified by noting which of the reference spectrum peaks are absorbed and by the amount they are absorbed.

11 Claims, 3 Drawing Figures

PATENTED MAY 8 1973 3,732,017

INVENTOR
WILLIAM G. WOLBER

BY *Lester L. Wallacher*

ATTORNEY

GAS ANALYZER UTILIZING A TUNABLE LASER WITH A REFERENCE SUBSTANCE IN THE LASER CAVITY

BACKGROUND OF THE INVENTION

Optical spectroscopy has long been used as a gas analysis technique. Such techniques ordinarily employ a broad band source of radiant energy which is used to illuminate the sample being analyzed. The energy from the source is filtered so that a particular frequency within the broad band of the illuminating source impinges upon the sample; filtering may alternatively take place after energy is absorbed by the sample. Particular wavelengths which are characteristic of a particular atom or molecule in the sample gas are absorbed by the atoms or molecules within the sample. The atomic or molecular absorption of the illuminating energy thus produces a series of absorption lines within the illuminating energy. The spectrum of energy passing from the sample is thus uniquely characteristic of the gases which compose the sample. A broad band detector is then used to detect the energy not absorbed in the sample, and the frequency locations of absorbed energy lines are indicative of the characteristics of gas and the gas sample is thus analyzed.

Optical instruments utilizing this technique are not entirely satisfactory for several reasons. Firstly, because the bandwidth of the radiating source is very wide, it is necessary to filter the illumination so that a particular frequency impinges upon the sample. This requires expensive and complex filters or monochromators and, accordingly, greatly adds to the cost of the equipment. It also complicates the procedure for using the equipment because it is necessary to rotate and change the filters or to scan the monochromator in order to achieve the selectivity required. The technique is time consuming because of the required accurate rotation and changing of filters. Furthermore, these procedures also introduce inaccuracies to the results obtained by the technique.

Another difficulty is that the selectivity of the method is limited by the narrowness of the absorption lines and the quality of the filters or monochromator. These factors also influence the sensitivity of the method; that is, how small a concentration of a particular gas can be detected. Moreover, the spectrum becomes quite complex for a mixture of gases, since some of the absorption lines for one species of gas may overlap some of those for another. This complexity leads to serious difficulty in interpretation of the spectrum, especially when some of the interesting gases are much more abundant in the sample than others.

SUMMARY OF THE INVENTION

The invention is directed to a system which overcomes the above-mentioned deficiencies. In the inventive system, a reference gas of known composition is introduced into the cavity of a tunable laser. Because of the presence of the gas in the laser cavity, the laser will oscillate, or lase, only at the absorption frequencies of the reference gas. Accordingly, as the laser is tuned through its frequency range, the output of the laser will be a reference spectrum containing a series of lines, with the lines occurring at the frequencies which correspond to the absorption frequencies of the reference gas. The unknown sample gas is illuminated with the reference spectrum, and if the sample gas is identical to the reference gas all the lines in the reference spectrum will be absorbed. If the reference gas and the unknown gas are composed of mixtures of several component gases, only the frequency lines which correspond to the component gases common to both the unknown gas and the reference gas will be absorbed. Accordingly, the composition of the sample gas can be identified by the absorption of the frequency lines from the reference spectrum. The absorption of the lines is detected by a broad band detector which receives the radiation emanating from the sample.

The inventive system can be used in another manner. The laser can be locked to one or a few frequencies of the known reference gas. This produces a reference spectrum containing one, or a few, frequency lines. The laser illumination is then directed to a sample cell which contains the unknown gas and the radiation from the sample is detected by a broad band detector. Because the laser lines are so very monochromatic, only the transitions which are characteristic of the species of gas sought will strongly absorb the laser energy. The absorption of the laser energy by the sample gas results in the elimination of the lines from the laser output and, accordingly, is indicative of a correlation between the sample gas and the reference gas. Because the line width achievable is in the order of 0.03 cm, the selectivity of this technique is a significant improvement over that of the presently existing systems which usually have a line width in the order of 0.3 cm.

The invention is described in reference to a gas analyzer. Although this is a preferred environment for the invention, it is not to be so limited as any material which exhibits the required frequency absorbing characteristics can be analyzed utilizing the system.

DETAILED DESCRIPTION

Figure 1:
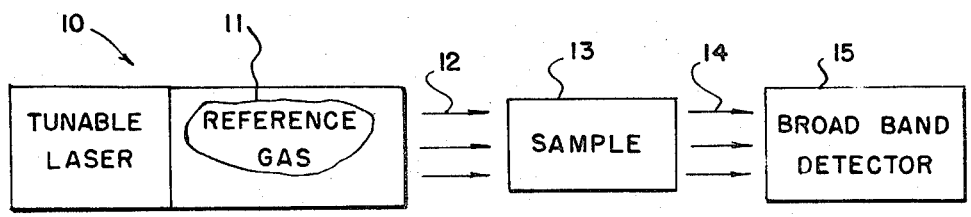
FIG. 1 is a preferred embodiment of the inventive system.

The preferred embodiment shown in FIG. 1 includes a tunable laser 10 having a resonant cavity 11. Tunable laser 10 is of a type well known in the art and can have a tunable frequency range in the order of one octave. A reference gas is introduced into cavity 11 to inhibit the normal oscillation, or lasing, of laser 10. The reference gas can be either a pure gas or a mixture of several gases. The reference gas is selected such that identical gases can be identified from one or more samples of unknown gases. The presence of the reference gas in cavity 11 inhibits the lasing action of tunable laser 10, and the laser will therefore yield an output only at those frequencies which correspond to the absorption frequencies of the reference gas. Accordingly, the output radiation of the laser, which is indicated by reference numeral 12 in FIG. 1, is a series of very narrow lines occurring at the absorption frequencies of the reference gas.

Figure 2:
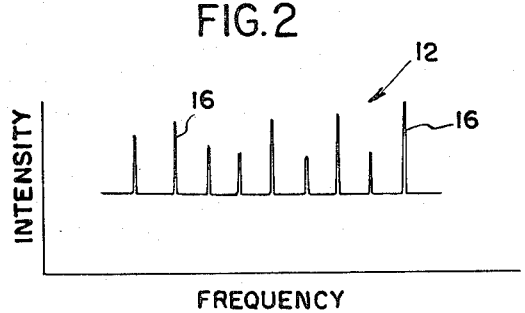
FIG. 2 is an exemplary reference spectrum obtained from the inventive system.

FIG. 2 is an illustration of a reference spectrum obtainable from the laser 10 for a particular mixture of reference gases. The lines 16 are those which occur at the absorption frequencies of the reference gas as laser 10 is tuned through its frequency band. Accordingly, a particular spectrum is uniquely characteristic of a particular gas, or mixture of gases, which has been introduced into the resonant cavity 11 of laser 10.

The reference spectrum output 12 is used to illuminate a sample 13 of the unknown gas so that the output radiation 14 is the reference spectrum 12 as modified by absorption in the unknown gas. The diminution of the lines 16 from the sample output 14 at particular absorption frequencies is indicative of the absorption of radiation at those frequencies and, accordingly, indicates that the sample is partially composed of the component gas represented by the absorbed frequency lines. The output radiation 14 from sample 13 is detected by broad band detector 15 where the diminution of the reference spectrum 12 is noted and the sample gas thus identified.

This particular mode of operation therefore consists of tuning the laser 10 through its entire frequency range while observing and recording the reference spectrum obtained during the tuning. Simultaneously, a sample gas 13 is positioned at the output of laser 10 so that the reference spectrum 12 illuminates the sample gas. Because of the molecular, or atomic, structure of sample 13, the lines 16 are absorbed by the sample gas and the absence of these particular lines is noted by comparing the recorded output radiation 14 of the sample 13 with the recorded reference spectrum. The diminution lines at particular frequencies indicate the absorption frequencies of the sample 13 material and, accordingly, uniquely identify the sample material. It should be noted that if the sample material 13 and the reference material are identical all lines will be proportionally diminished. Alternatively, if the reference gas is a mixture of several component gases, and the sample gas 13 contains only one or several of the same component gases, only the frequency lines which correspond to the common component gases will be diminutated from the reference spectrum.

In another method of using the inventive system, laser 10 is frequency locked to one of the absorption frequencies of a reference gas of known composition which has been introduced into resonant chamber 11 of the laser 10. The reference gas is chosen to correspond to a component gas desired to be established as existing in the sample 13. The output reference spectrum 12 of laser 10 then includes one narrow line 16 which is indicative of a particular absorption frequency of the known reference gas. This line is used to illuminate the sample, and when the composition of the sample partly or wholly corresponds to that of the reference gas the line is partly absorbed. Because the locked mode laser line is so very monochromatic, only the transitions characteristic of the species desired to be sensed will strongly absorb the laser energy. The selectivity of this technique is better than that which can be achieved by any of the other known systems, because the line width realizable by the inventive system is in the order of 0.03 $cms^{-1}$, approximately one-tenth of that achievable with the prior art systems.

Figure 3:
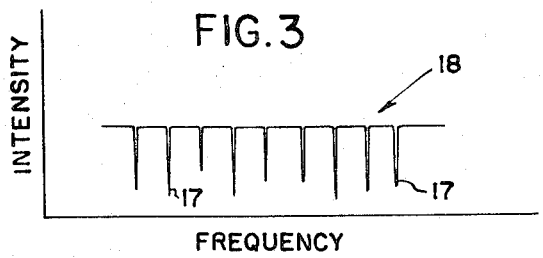
FIG. 3 is an exemplary spectrum obtained by the prior art systems.

FIG. 3 is useful in understanding the operational differences between the inventive system and the prior art systems. As explained herein above, the inventive system is dependent upon the creation of energy lines in the reference output. This is accomplished by introducing a reference gas into the laser cavity so that lasing occurs only at frequencies which correspond to the absorption frequencies of the reference gas. This is different from the prior art systems where an energy source having a broad frequency band is used to illuminate a sample of the gas to be analyzed. High intensity illuminating energy is available over the broad band of the illuminating source and energy is absorbed at the absorption frequencies of the sample gas. Accordingly, the output spectrum contains a plurality of absorption lines. These lines which correspond to the absorption frequencies of the sample gas are represented by the dips 17 in the wave form 18 of the FIG. 3. In order to use these lines to identify the sample, a precision scanning monochromator or filter set is needed with the detector.

In the inventive system the detector should have a band width as broad as the tuning range of the laser, and the frequency measuring monochromator is not needed. The filtering required in the prior art systems is very intricate and quite expensive and adds to the disadvantages of the prior art systems. The prior art systems are also time consuming. After a particular absorption line has been observed, and the frequency thereof recorded, it is necessary to tune the system by rotating the gratings and sometimes changing the filters so that the next succeeding line can be recorded. Commonly, one scans slowly through the whole possible range of absorption lines. The inventive system is therefore much less expensive to build and is simpler to use than any of the existing prior art systems.

What is claimed is:

1. A system for qualitatively analyzing unknown substances comprising:

a tunable source of coherent energy having a resonant cavity and a reference substance of known composition in said cavity, said reference substance allowing said tunable source to oscillate and thereby produce an output only at the frequencies corresponding to the absorption frequencies of said reference substance so that the output radiation of said source when tuned is a reference spectrum having a plurality of lines, said lines occurring at frequencies which correspond to the absorption frequencies of said reference substance;

means for supporting a sample of an unknown substance to be analyzed in the proximity of said source so that said sample is subjected to said reference spectrum, said sample absorbing lines from said reference spectrum at frequencies which correspond to the absorption frequencies of said sample so that similarities in the composition of said reference substance and said sample substance are indicated by said line absorption.

2. The system of claim 1 wherein said source of coherent energy is a tunable laser and said reference substance is composed of a single substance so that all lines in said reference spectrum are absorbed when said sample substance is at least partially identical to said reference substance.

3. The system of claim 1 wherein said source of coherent energy is a tunable laser and said reference substance is a mixture of several known component substances so that a portion of said lines in said reference spectrum are absorbed when said reference substance and said sample substance contain common component substances, and all of said lines are proportionally absorbed when said reference substance and said sample substance are identical mixtures.

4. The system of claim 2 wherein said reference substance and said sample substance are gases.

5. The system of claim 3 wherein said reference substance and said sample substance are gases.

6. The system of claim 1 wherein said energy source is a laser tunable over a frequency range in the order of one octave; and including a broad band detector receiving the radiation from said sample, the absorption of said lines being indicated by said detector to thereby unambiguously identify said sample substance.

7. The system of claim 6 wherein said source of coherent energy is a tunable laser and said reference substance is composed of a single gas so that all lines in said reference spectrum are absorbed when said sample substance is at least partially identical to said reference gas.

8. The gas analyzer of claim 6 wherein said source of coherent energy is a tunable laser and said reference substance is a mixture of several known gases so that a portion of said lines in said reference spectrum are absorbed when said reference gas and said sample substance contain common components, and all of said lines are proportionally absorbed when said reference gas and said sample gas are identical mixtures.

9. A method of analyzing a sample gas of unknown composition including the steps of:

introducing a reference gas of known composition into the resonant cavity of a tunable laser;

obtaining a reference spectrum by tuning said laser over a frequency range consistent with the absorption frequencies of said reference gas so that a reference spectrum containing a plurality of lines at frequencies corresponding to said absorption frequencies is obtained;

illuminating a sample of a gas to be analyzed with said reference spectrum, said sample gas absorbing said lines at absorption frequencies of said sample which correspond to absorption frequencies of said reference gas;

detecting the illumination from said sample and noting the absorption of said reference lines to unambiguously identify said sample gas.

10. The method of claim 9 wherein said step of introducing includes introducing a plurality of known gases into said cavity so that said reference gas is a mixture of gases.

11. A method of analyzing an unknown gas sample including the steps of:

introducing a reference gas into the resonant cavity of a tunable laser, said reference gas allowing said laser to oscillate only at frequencies which correspond to the absorption frequencies of said reference gas;

obtaining at least one reference line by tuning said laser to one of said absorption frequencies;

locking said laser to said one absorption frequency;

exposing said sample gas to said reference line and detecting the radiation passing through said sample, absorption of said line unambiguously revealing a similarity of composition between said reference gas and said sample gas.

* * * * *